Oct. 13, 1970  E. M. RUBIN  3,533,528
FLEXIBLE PLASTIC CORK DEVICE
Filed March 11, 1969
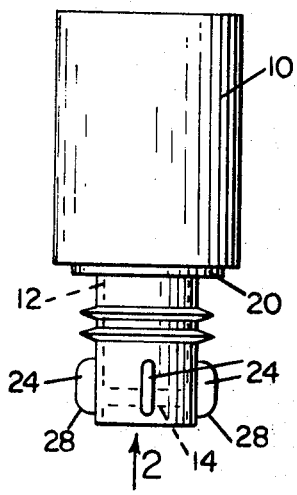
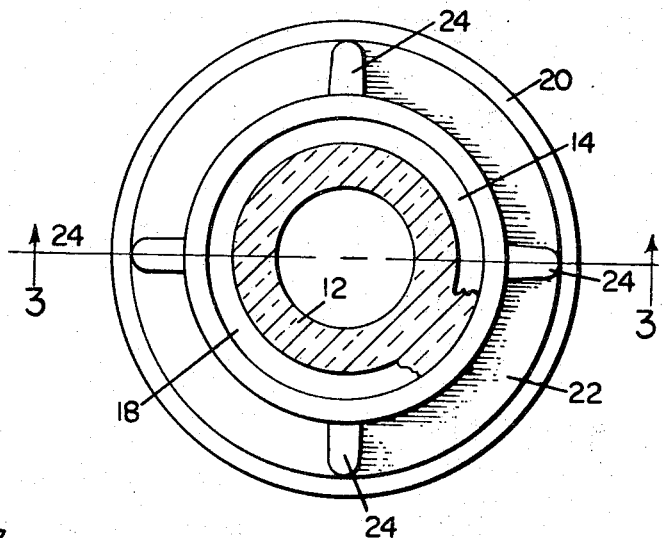
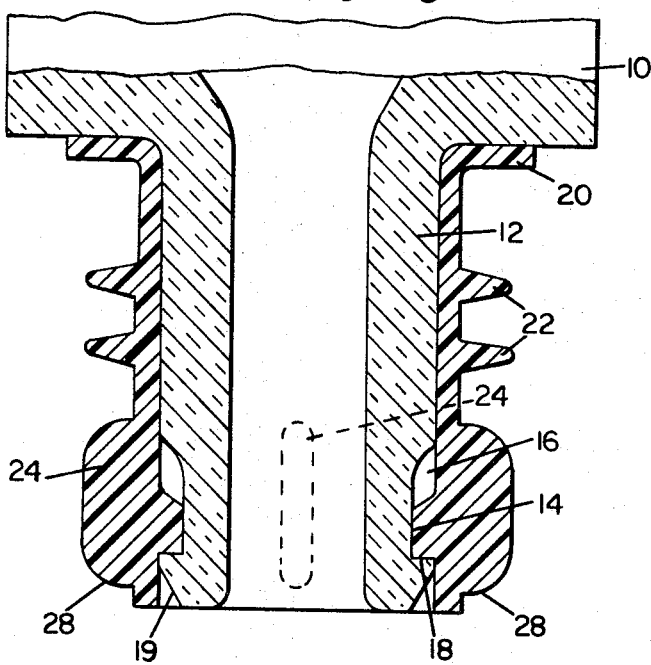
INVENTOR
EDWARD M. RUBIN
BY *Chas. R. Day*,
ATTORNEY

United States Patent Office 3,533,528
Patented Oct. 13, 1970

3,533,528
FLEXIBLE PLASTIC CORK DEVICE
Edward M. Rubin, 53 Briar Terrace,
Worcester, Mass. 01606
Continuation-in-part of application Ser. No. 669,152,
Sept. 20, 1967. This application Mar. 11, 1969, Ser.
No. 806,102
Int. Cl. B65d *39/00*
U.S. Cl. 215—48                                           3 Claims

ABSTRACT OF THE DISCLOSURE

A plastic cork for the stem of a glass stopper having an annular groove, and comprising a generally cylindrical plastic shell permanently receiving the glass stem of the stopper and having exterior sealing rings and an interior rib located in the groove.

---

This application is a continuation-in-part of Ser. No. 669,152, filed Sept. 20, 1967 and now abandoned.

BACKGROUND OF THE INVENTION

This invention relates to a flexible plastic cork for use with the stem of the glass stopper, generally used with a glass bottle. It is well known that the inside diameters of the necks of glass bottles vary considerably and in the prior art it has been common to provide a plurality of outstanding annular sealing rings on corks; but this has been found to leave room for leakage past the initial or end rings on the stem, this in turn causing liquid to be held between certain of the sealing rings so that when the stopper is removed from the bottle a splattering effect occurs.

SUMMARY OF THE INVENTION

This invention provides a series of mutually, circumferentially spaced vertical, i.e., longitudinal, outwardly extending radial stabilization fins adjacent the end of the cork at the free end of the stem which is first inserted into the neck of the bottle. These fins stabilize the stopper in the neck of the bottle providing at the same time for a good sealing action of a sealing ring or rings between the fins and the hand-manipulated portion of the stopper. In this way the vertical fins stabilize the stopper as it is inserted in the bottle and being slightly flexible may give under lateral pressure so that the sealing ring or rings are centered and are fully effective to prevent any liquid rising above the lowermost of the sealing rings.

Also, the annular corks of the prior art easily separate from the stems of the stoppers, and this invention provides a relatively simple but positive strong and permanent interconnection between the cork and the stem.

BRIEF DESCRIPTION OF THE DRAWINGS

FIG. 1 is a view in elevation illustrating the new cork applied to a glass stopper;

FIG. 2 is a bottom plan view with part in section and on an enlarged scale looking in the direction of arrow 2 in FIG. 1, and FIG. 3 is a section on line 3—3 of FIG. 2 with the stem of the glass stopper in place.

PREFERRED EMBODIMENT OF THE INVENTION

As is well known in the art, the interior diameters of the necks of glass bottles vary considerably both from end to end and with other irregularities. When using a glass stopper having a glass stem, a good seal is substantially impossible, so therefore it is common to provide a cork in the form of a sleeve surrounding the stem of the glass stopper, attempting to solve the problem of insufficient contact between the glass stem of the stopper and the interior wall of the neck of the bottle.

This invention provides a plastic e.g. polyethylene cork or liner which is provided with one or more sealing rings to prevent liquid from rising around the stem of the stopper in combination with vertical stabilizing fins, the material of the new cork being flexible and the fins stabilizing and centering the stopper in the neck of the bottle so that the sealing ring or rings are above the same and are made fully effective to prevent leakage of liquid past them. At the same time, a positive mechanical interconnection between the cork and glass stem permanently prevents separation of the cork.

Referring now to FIG. 1 there is shown at 10 a handle or hand-manipulated portion of a glass or equivalent stopper which is provided with a depending stem 12. About this stem there is provided the new plastic e.g. polyethylene cork which is in the form of a onepiece cylindrical sleeve. This cork has an annular interior ring or ridge 14, and the stem 12 has a corresponding exterior groove 16 accepting ring or ridge 14. It will be seen that the cork is firmly held by this interengaging construction, especially where the general diameter of the stem 12 is approximately the same as the interior diameter of the cork, and it is just about impossible to pull the cork from the stem.

The ring or ridge 14 and the groove 16 have mating flat shoulders at 18, and these prevent the separation of the cork from the stem. The stem has a beveled extreme edge 20 that facilitates assembly of the cork onto the stem to snap the ring or ridge 14 past the flat annular shoulder on the stem.

There may be provided an integral flange 20 on the cork to firmly and tightly contact portions of the glass stopper as is indicated in FIG. 1 and to form a gasket with the pouring lip or rim of the glass bottle which is not shown but may be any kind of conventional type of bottle. The main portion of the cork comprises a cylindrical sleeve provided with one or more spaced sealing rings 22 which are annular and extend peripherally outwardly as clearly shown in FIGS. 1 and 2. These sealing rings are adapted to prevent leakage of liquid past the same, i.e., in an upward direction in FIGS. 1 and 3.

The present invention provides for a series of spaced vertical, i.e., longitudinal outwardly extending generally radial fins 24. In the present case there are shown four of these fins but there may be any desired number. These fins are of course flexible as is the entire material of the cork and it is preferred that they should have slightly rounded edges as at 26, see FIG. 2. Also they are preferred to be rounded off along their edges at 28, see FIG. 3, for easy insertion of the cork and combined stopper into the neck of the bottle.

It will be seen that the fins will center the stopper in the neck of the bottle since they in effect surround the stem and contact the inside of the neck generally equally. They can flex or warp slightly in order to more exactly conform to the interior of the neck of the bottle even though the latter should be somewhat defective or irregular. This being the case, the sealing rings at 22 become fully effective to tightly seal the interior of the neck of the bottle and of course these rings are also somewhat flexible so that a full sealing action is provided.

In view of the above it will be clear that the corked stem is easily applied to and removed from the bottle but at the same time it is always stable and centered so that no liquid can rise above the lowermost sealing ring 22, i.e., that one which is adjacent to the fins 24, and the cork will not separate from the stem even under conditions of rough and length use and re-use.

I claim:
1. The combination of a stopper having a stem for entering the neck of a bottle, with a plastic semi-flexible cork in the form of a sleeve surrounding the stem, the stem and cork having generally coincident free ends that enter the bottle neck first, and a series of circumferentially spaced distortable radial fins on the plastic cork at the exterior thereof, said fins being shorter than the cork and located at the free end thereof for guiding the stem and cork into the bottle and stabilizing the same therein preventing wobble.
2. The combination of claim 1 wherein the fins have a thickness less than their radial extent.
3. The combination of claim 1 including a distortable sealing ring on the plastic cork adjacent the opposite end thereof from the fins, said ring being annular and extending radially outwardly from the cork, said ring sealing the neck of the bottle against any flow of liquid therepast due to the stabilizing effect of the fins which ensure that the entire circumference of the cork is in sealing contact with the interior wall of the neck of the bottle.

References Cited
UNITED STATES PATENTS 3,184,090  5/1965  Robinson _____ 215—48

FOREIGN PATENTS 1,479,255  3/1967  France.
536,756  12/1955  Italy.

GEORGE T. HALL, Primary Examiner

UNITED STATES PATENT OFFICE
CERTIFICATE OF CORRECTION

Patent No. 3,533,528                                 Dated Oct. 13, 1970

Inventor(s) Edward M. Rubin

It is certified that error appears in the above-identified patent and that said Letters Patent are hereby corrected as shown below:

The address of the inventor should read:

Edward M. Rubin, 53 Briar Terrace,

Leominster, Massachusetts   01453

SIGNED AND SEALED
JAN 5 1971

(SEAL)
Attest:

Edward M. Fletcher, Jr.
Attesting Officer

WILLIAM E. SCHUYLER, JR.
Commissioner of Patents